(12) United States Patent
DeMers (10) Patent No.: US 8,701,334 B2
(45) Date of Patent: Apr. 22, 2014

(54) FOOT SNARE TRIGGERING DEVICE

(75) Inventor: Michael Steven DeMers, Great Falls, MT (US)

(73) Assignee: Universal Select-A-Catch LLC, Valier, MT (US)

( * ) Notice: Subject to any disclaimer, the term of this patent is extended or adjusted under 35 U.S.C. 154(b) by 294 days.

(21) Appl. No.: 13/083,283

(22) Filed: Apr. 8, 2011

(65) Prior Publication Data

US 2011/0265368 A1    Nov. 3, 2011

Related U.S. Application Data

(60) Provisional application No. 61/328,982, filed on Apr. 28, 2010.

(51) Int. Cl.
*A01M 23/34* (2006.01)
(52) U.S. Cl.
USPC ........................................ 43/87; 43/85; 43/86
(58) Field of Classification Search
USPC ............................................ 43/85–87, 81, 58
IPC .............................................. A01M 23/00,23/24
See application file for complete search history.

(56) References Cited

U.S. PATENT DOCUMENTS

| | | | | |
|---|---|---|---|---|
| 2,168,132 A | * | 8/1939 | Marshall | 43/87 |
| 2,592,390 A | | 4/1952 | Burt | |
| 3,060,623 A | | 10/1962 | Aldrich | |
| 4,179,837 A | | 12/1979 | Gummeringer | |
| 4,208,827 A | | 6/1980 | Starky | |
| 4,250,653 A | * | 2/1981 | Davies | 43/87 |
| 4,286,404 A | | 9/1981 | Novak | |
| 4,329,805 A | | 5/1982 | Novak | |
| 4,513,527 A | | 4/1985 | Wicklund | |
| 4,581,844 A | | 4/1986 | Torkko | |
| 4,660,319 A | * | 4/1987 | Ellwood | 43/96 |
| 4,739,578 A | | 4/1988 | Pitchford, Jr. | |
| 4,751,790 A | | 6/1988 | Thomas | |
| 4,827,662 A | | 5/1989 | Dahlman | |
| 5,691,510 A | * | 11/1997 | Turman | 177/225 |
| 6,016,624 A | | 1/2000 | Rose | |
| 6,032,405 A | | 3/2000 | Rose | |

FOREIGN PATENT DOCUMENTS

| | | | |
|---|---|---|---|
| FR | 2770970 A1 | * | 5/1999 |
| JP | 05064536 A | * | 3/1993 |
| JP | 2006006234 A | * | 1/2006 |

* cited by examiner

*Primary Examiner* — Darren W Ark
*Assistant Examiner* — George Andonyan
(74) *Attorney, Agent, or Firm* — William L. MacBride, Jr.

(57) ABSTRACT

The foot snare triggering device of the present invention is designed to be used with a foot snare, and comprises a trigger plate assembly, having a tension adjustment means which allows the trigger plate assembly to pivotally yield to vertical pressure. A trigger mechanism has a trigger end set within said plate assembly and a mechanism end attached to an extension mechanism, and a snare attachment port located within the trigger mechanism for releasably securing a foot snare by moving longitudinally when the trigger mechanism is engaged by pressure to said plate assembly allowing a foot snare to be released from the snare attachment port after triggering said device. A pan is pivotally connected by a hinge to the plate underside distal to the pan tension adjustment means. The pan has a trigger mount located adjacent to the trigger assembly connection through which the trigger mount engagingly receives the trigger mechanism.

10 Claims, 6 Drawing Sheets

FOOT SNARE TRIGGERING DEVICE

This application claims priority from the provisional patent application filed Apr. 28, 2010, Application No. 61/328,982 and Confirmation Number 7683.

FIELD OF THE INVENTION

The present invention relates to a foot snare triggering device, in particular to one which is used for setting foot snare animal traps, modifying and improving the conventional animal snare trigger devices known in the industry.

BACKGROUND OF THE INVENTION

The capturing of animals for pelts and attendant animal damage control is a long-practiced art. Through the years attempts have been made to make animal foot snare traps, commonly operating via a triggering device, in a more selective and humane manner to the trapped animal prey. Several states and countries have now outlawed steel leg hold traps, and pressure continues to grow for more states to do the same. The present invention is a triggering device to be used with snares and other trapping means, which has a wide variety of trapping uses on animals of differing sizes. The present invention is a humane selective foot snare triggering device which will be a valuable tool in capturing a wide variety of animals, and is easy to set as an extension mechanism powered, weight tensioned device.

Animal traps in the related art commonly consist of a foot snare or other trap device to catch a game animal, activated by a spring mechanism requiring a trigger mechanism to set and then release the trap. Foot snare traps in the related art, include: U.S. Pat. No. 3,060,623 to Aldrich ("'623 Patent"), U.S. Pat. Nos. 4,286,404 and 4,329,805 to Novak ("'404 Patent" and "'805 Patent"), U.S. Pat. No. 4,581,843 to Fremont, et al ("'843 Patent"), U.S. Pat. No. 2,592,390 to Burt ("'390 Patent"), U.S. Pat. No. 4,581,844 to Torkko ("'844 Patent"), U.S. Pat. No. 4,751,790 to Thomas ("'790 Patent"), and U.S. Pat. No. 6,032,405 to Rose ("'405 Patent"). All such referenced devices require a tensional or compressional spring mechanism to activate the snare, or utilize a spring throw arm as a lifting means for providing an oblique movement of the foot snare loop to catch the game animal, necessary when the trap is sprung or triggered to enable the snare to catch the ankle of the game animal and not result in a "toe catch" (catching only the animal's foot or toes), a common occurrence with many snare traps in existence. None of the related prior art provides the extensional mechanism of the present invention which operates to activate a foot snare trap in a longitudinal or horizontal direction omitting any "throw arm" motion to provide the necessary oblique movement for the snare, the snare in these references being directly driven by the spring. This oblique movement is provided by one embodiment of the present invention by a moving means such as an elevation rod, or rods, pivotally connected to a trigger plate assembly. Neither the aforementioned patents nor those citations that follow provide the extensional mechanism of the present invention and would not teach the inclusion of or use of such an element, as they rely on the spring throw arm of a spring mechanism, or exclude any oblique movement provision.

Some related art triggering a foot snare do utilize a longitudinal or horizontal compressional or tension spring mechanism, such as a tensional spring, including: U.S. Pat. No. 2,168,132 to Marshall ("'132 Patent"), U.S. Pat. No. 4,208,827 to Starky ("'827 Patent"), U.S. Pat. No. 4,250,653 to Davies ("'653 Patent"), U.S. Pat. No. 4,827,662 to Dahlman ("'662 Patent"), and U.S. Pat. No. 4,739,578 to Pitchford, Jr. ("'578 Patent"). However, none of these related art patents have a trigger mechanism located within said spring mechanism housing, attached directly to the extension mechanism as is provided in one embodiment of the present invention. All of said patents have triggers located on the outside of the spring mechanism housing, and could not provide for or teach a trigger location within the housing since they provide for snares attached directly to the spring mechanisms, rendering these devices inoperative to achieve the results of the present invention. As well, the '662 Patent is a mole trap operating in a vertical manner.

The snare traps found in the '527 Patent, the '827 Patent, the '837 Patent, the '623 Patent, the '653 Patent, the '662 Patent, the '578 Patent, and the '132 Patent all attach directly to the spring mechanism, the snare being directly driven by a spring operating in a different manner than the present invention. None of the related art patents or devices mentioned immediately above provide for the release of the snare trap to the trigger or spring mechanism after the trap is activated, as provided in the embodiment of the present invention. The present invention allows for use of a detachable snare attached by the operator. By having a snare attachment port located on the outside of the extension mechanism housing, the present invention provides for releasing the attached snare once the snare is triggered. All of the cited, related, prior art patents function to capture and retain the animal trapped in connection with the trigger and spring mechanism, while the present invention operates to release the snare holding the animal once the trigger mechanism activates the snare to trap the animal. As well, Patents '622, U.S. Pat. No. 4,179,837 to Gummeringer ("'837 Patent"), and U.S. Pat. No. 4,513,527 to Wicklund ("'527 Patent") utilize this retention function to dispose of the trapped animal. None of these cited patents provide for a pan tension adjustment means of the present invention. Therefore, none of these animal trapping and retention patents and devices teach or operate with the structure and function of the present invention.

While U.S. Pat. No. 6,016,624 to Rose ("'624 Patent") discloses a trigger mechanism for an animal trap, it is solely a tension regulating device without a means to activate a trap to catch animals comprising a movable plate adjustable to the weight of an animal, and the device of this related art may not be used in combination with other devices or elements of an embodiment of the present invention necessary to operate in the same manner or function as the present invention. The '624 Patent (as well as all the other patents cited herein) operates in a completely different manner than the present invention, the '624 Patent utilizing cams rather than an extension mechanism such as a return spring in one embodiment of the present invention. The '624 Patent is not adapted to receive the trigger mechanism of the present invention, and is therefore inoperable to set such trigger mechanism and teaches away from the present invention.

While the '527 Patent and '837 Patent do locate trigger mechanisms within the extension mechanism housing, neither would teach an embodiment of the present invention. The '837 Patent requires catching the animal initially before applying the snare trigger mechanism, and the '527 Patent, as well as the '827 and '653 Patents, use compressional spring mechanisms attaching directly to the snare trap, operating in an opposing manner to the present invention, which in one embodiment of the present invention uses an extension return spring pulling rather than pushing the snare away from the animal prey, making the cited references inoperable as the present invention. The '527 Patent, as well as the '653 and '827 Patents operate with compressional spring mechanisms. Neither does the '624 Patent, '527 Patent, nor the '837 Patent disclose the snare trap releasing function and structure of the present invention.

SUMMARY OF THE INVENTION

The foot snare triggering device of the present invention is designed to be used in combination with foot snares.

One embodiment of the present invention, the foot snare triggering device comprises a trigger plate assembly having a pan tension adjustment means which allows the trigger plate assembly to pivotally yield to vertically applied pressure and a base plate of varying diameters depending on the size of the target animal to be captured. The foot snare triggering device further comprises a trigger mechanism having a trigger end engagingly set within the trigger plate assembly and a mechanism end operatively attached to an extension mechanism, and a snare attachment port located within the trigger mechanism for releasably securing a foot snare. The device of the present invention may accommodate any number of foot snares known in the industry, attaching to its snare attachment port, for trapping animal prey of varying sizes. The foot snare triggering device triggers the foot snare and allows it to be released from the snare attachment port after being triggered.

The trigger plate assembly of an embodiment of the present invention comprises a base plate having a plate underside and defining a pan opening. A pan is pivotally connected by a pan hinge to the plate underside distal to the pan tension adjustment means and the trigger mechanism. The pan has a trigger mount located adjacent to the trigger assembly connection through which the trigger mount engagingly receives the trigger mechanism, said mount having a mount slot to cooperatively receive and engage the trigger mechanism. The pan pivots downward when receiving said applied pressure, thereby engaging the trigger mechanism. The extension mechanism of an embodiment of the present invention causes the snare attachment port to move longitudinally when the trigger mechanism is engaged, or triggered, by applied pressure to the trigger plate assembly.

One embodiment of the present invention also comprises a moving means, attached to the trigger plate assembly, within which the foot snare removably rests, allowing the foot snare to move obliquely toward the extension mechanism when the trigger mechanism is engaged.

In another embodiment, the trigger mechanism and the extension mechanism are enclosed in the trigger housing having an end cap opposingly located from the trigger mechanism and cooperatively adjacent to the extension mechanism, and a housing slot inserted longitudinally along the trigger housing, allowing the snare attachment port and an attached snare attachment means to move with the trigger mechanism within the trigger housing toward the end cap when the device is triggered.

The expansion mechanism in another embodiment of the present invention comprises a return spring longitudinally connected to the mechanism end of the trigger mechanism at a spring attachment hole and an opposite return spring attachment anchor. The return spring engages the trigger mechanism at the mechanism end and anchors to said housing by the return spring attachment anchor within the end cap.

In an alternative embodiment of the present invention, having a pipe set firing mechanism, the trigger plate assembly of the present invention comprises a vertical pipe cooperatively attached to the plate underside and having an opposite lower end. The pipe set firing mechanism has a plurality of firing mechanism springs in cooperative connection with a firing pan which when depressed triggers the snare device, a trigger insert plate engaging the pipe set firing mechanism to the trigger mechanism and a plurality of firing mechanism stabilizing rods.

Another embodiment comprises a snare attachment means adapted to be slidably located on a foot snare and releasably installed in the snare attachment port.

One embodiment of the present invention includes the base plate/pan combination, replacing the solitary pan found on other snaring equipment which enables the present invention to be more easily concealed and stable. The weight activated spring-pan tension device gives greater target selectivity by minimizing the capture of smaller non-target animals. The spring powered horizontal, extension, or "side pull" triggering mechanism makes for a safer mechanism by eliminating the upward firing spring powered throw arm of related art, which may not only injure a person while setting the device, but also may hit a target animal making it shy of future sets if not captured.

When set properly, the device of the present invention may be used around livestock and other non-target animals with little chance of incidental captures. The side, or horizontal or longitudinal pull capturing method eliminates interference that would be found in the cited upward pull-triggering devices, and also captures animals in a more desirable location (wrist area), doing less leg damage than other pipe set designs, which captures bears higher on the leg and causing swelling.

One embodiment of the present invention, having a pipe set firing mechanism, is designed primarily for bears but may be used on other animals. This embodiment uses the extension mechanism with the firing pan, which engages a trigger recessed approximately eight inches into the vertical pipe, inserted into a hole flush with the ground. The spring powered trigger mechanism is slid forward engaging into the trigger mount. Bait is inserted into said pipe and when the animal reaches into the pipe, downward pressure on the firing pan activates the side spring trigger mechanism, which is attached to a snare that has been placed around the outside parameters of the pipe. The animal is then captured at the desired height on its leg when the snare is triggered.

In such an embodiment of the present invention, a foot snare is connected to the trigger mechanism from the outside of the vertical pipe to that embodiment. Once the animal is captured, the snare is released, independent from the firing mechanism.

This embodiment is virtually animal "dig proof". The base plate cover conceals the foot snare. If the animal tries to dig out, the foot snare stays in place. Previous pipe set models had the snare exposed and if a bear tried digging, the snare could be pulled off the top of the pipe rendering the device inoperable.

Time saving and simplicity in setting are two other advantages of the present invention. The extension mechanism and adjustable of embodiments pan tension of the present invention is much safer to use than the known upward or pivoting motion of coil spring (throw arm) devices which may accidentally trigger and cause harm to the person setting the device or hit the bear which could forever educate him to the device. Adjustable pan tension greatly reduces non-target captures.

A principal advantage with the present invention is being able to capture an animal in the animal wrist area, which is more desirable when capturing and relocating. Should a bear place his head into the vertical pipe of one embodiment, the firing pan placed at a proper depth in said pipe should prevent the device from being fired by contact with the bear's nose.

The embodiments of the present invention are durable, easy to set two-piece devices, made of a variety of durable materials including metal or high-density plastic.

Another objective is that by manufacture of a trigger mechanism device using non-corrosive materials, embodiments of the present invention will be operable in inclement weather.

An advantage of the present invention is greater reliability and functionality by using a horizontal or longitudinal extension mechanism device combined with an elevation rod, that rapidly pulls the snare upward and sideways simultaneously, thus capturing the animal.

Another advantage of the present invention is improving animal target specificity by using the adjustable pan tension device keeping the device from firing when a lighter non-target animal steps on the pan. When using this device in conjunction with a foot snare which has breakaway capabilities, non-target captures decrease significantly.

Another advantage is that by using the horizontal and longitudinal operating triggering device, as opposed to the upward firing trigger found on currently snare triggering mechanisms, the animal capture height can be predetermined.

The present invention minimizes setting time by requiring minimal dirt excavation. The pan of and embodiment of the present invention requires minimal downward travel to release the trigger, making this two-piece device effective, functional and easy to use.

Using an extension mechanism in an embodiment of the present invention makes it much safer to use than other foot snare devices using an upward release spring which when accidentally fired may cause injury to the user.

The foregoing and other objectives, advantages, aspects, and features of the present invention will be more fully understood and appreciated by those skilled in the art upon consideration of the detailed description of a preferred embodiment, presented below in conjunction with the accompanying drawings. The aforementioned features, aspects and advantages of the present invention, and further objectives and advantages of the invention, will become apparent from a consideration of the drawings and ensuing description.

BRIEF DESCRIPTION OF THE SEVERAL VIEWS OF THE DRAWINGS

The foregoing features and other aspects of the present invention are explained and other features and objectives of the present invention will become apparent in the following detailed descriptions, taken in conjunction with the accompanying drawings. However, the drawings are provided for purposes of illustration only, and are not intended as a definition of the limits of the invention.

DETAILED DESCRIPTION OF THE INVENTION

The present invention will now be described more fully hereinafter with references to the accompanying drawings, in which the preferred embodiment of the invention is shown. This invention may, however, be embodied in different forms, and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout.

Figure 1:
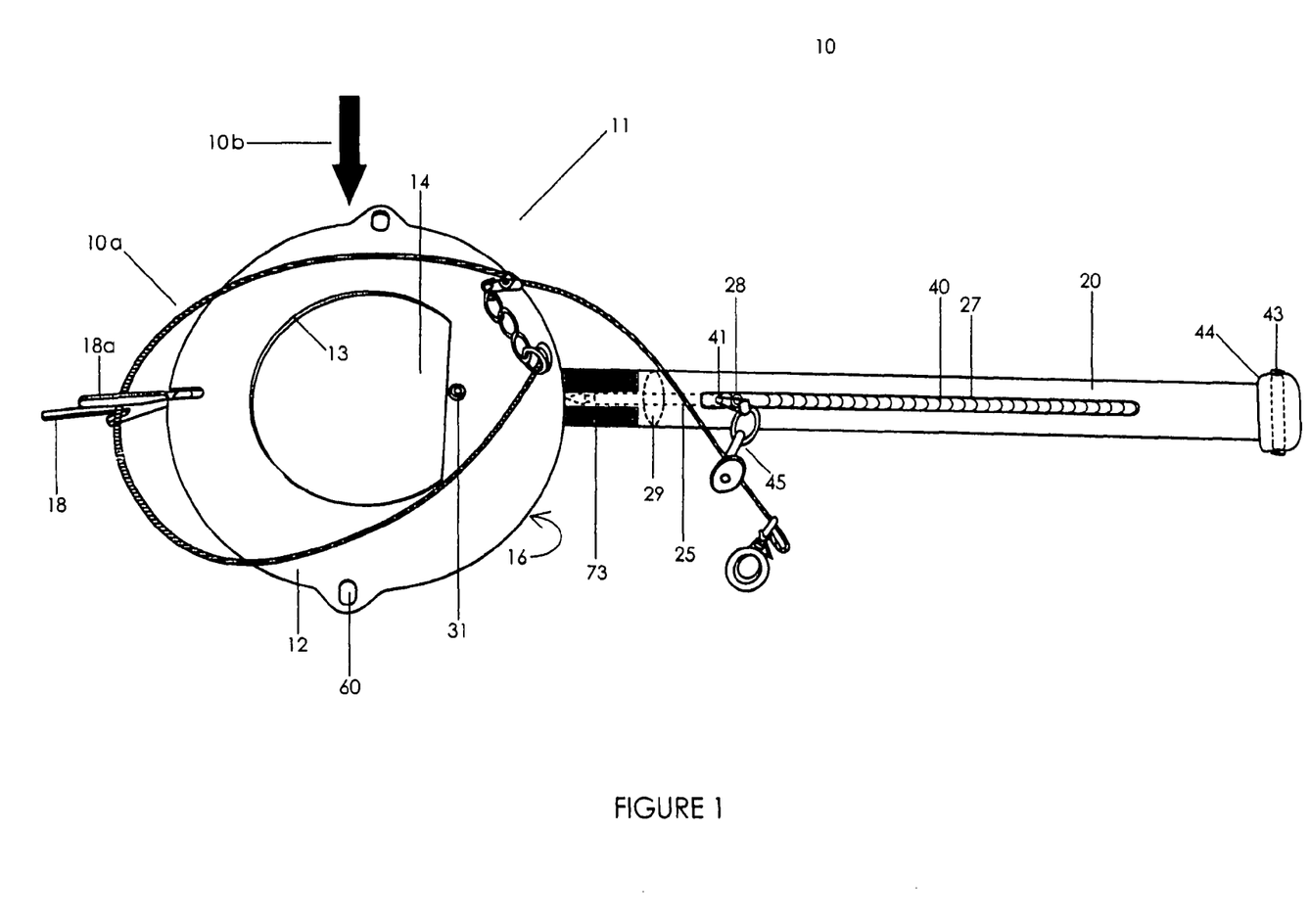
FIG. 1 illustrates a top plane view of one embodiment of the present invention, depicting it for operation with a foot snare.

Turning now in detail to the drawings in accordance with the present invention. FIG. 1 shows a top plane view of one embodiment of the foot snare triggering device 10, triggering a foot snare 10a, the device 10 comprising a trigger plate assembly 11 having a pan tension adjustment means 30 (shown in FIG. 3) which allows the trigger plate assembly 11 to pivotally yield to vertically applied pressure 10b. The vertically applied pressure 10b is the foot or paw step of an animal, target of the foot snare 10a, and of varying size and weight, different animals applying differing pressures.

Figure 4:
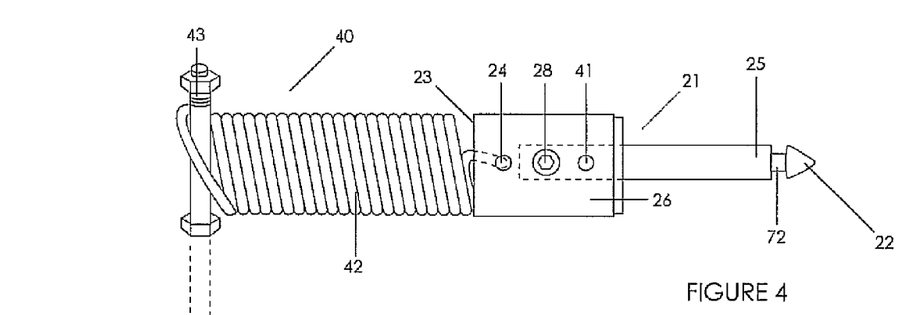
FIG. 4 illustrates the top plane view of the trigger mechanism and attached extension mechanism housed in the trigger housing, in a disengaged position from the trigger mount, in the embodiment of the present invention illustrated in FIG. 2.

The foot snare triggering device 10 further comprises, as shown in the top plane view of FIG. 4, a trigger mechanism 21 having a trigger end 22 and an opposite mechanism end 23, the trigger end 22 engagingly set within the trigger plate assembly 11 and the mechanism end 23, operatively and tensionally attached to an extension mechanism 40, and a snare attachment port 41 located with the trigger mechanism 21 proximal to the trigger end 22 for releasably securing a foot snare 10a. The device of the present invention may accommodate any number or types of foot snares known in the industry, attaching to its snare attachment port 41, for trapping animal prey of varying sizes. The device of the present invention may be made of any durable, resilient material, such as metal, plastic, or other materials.

Figure 2:
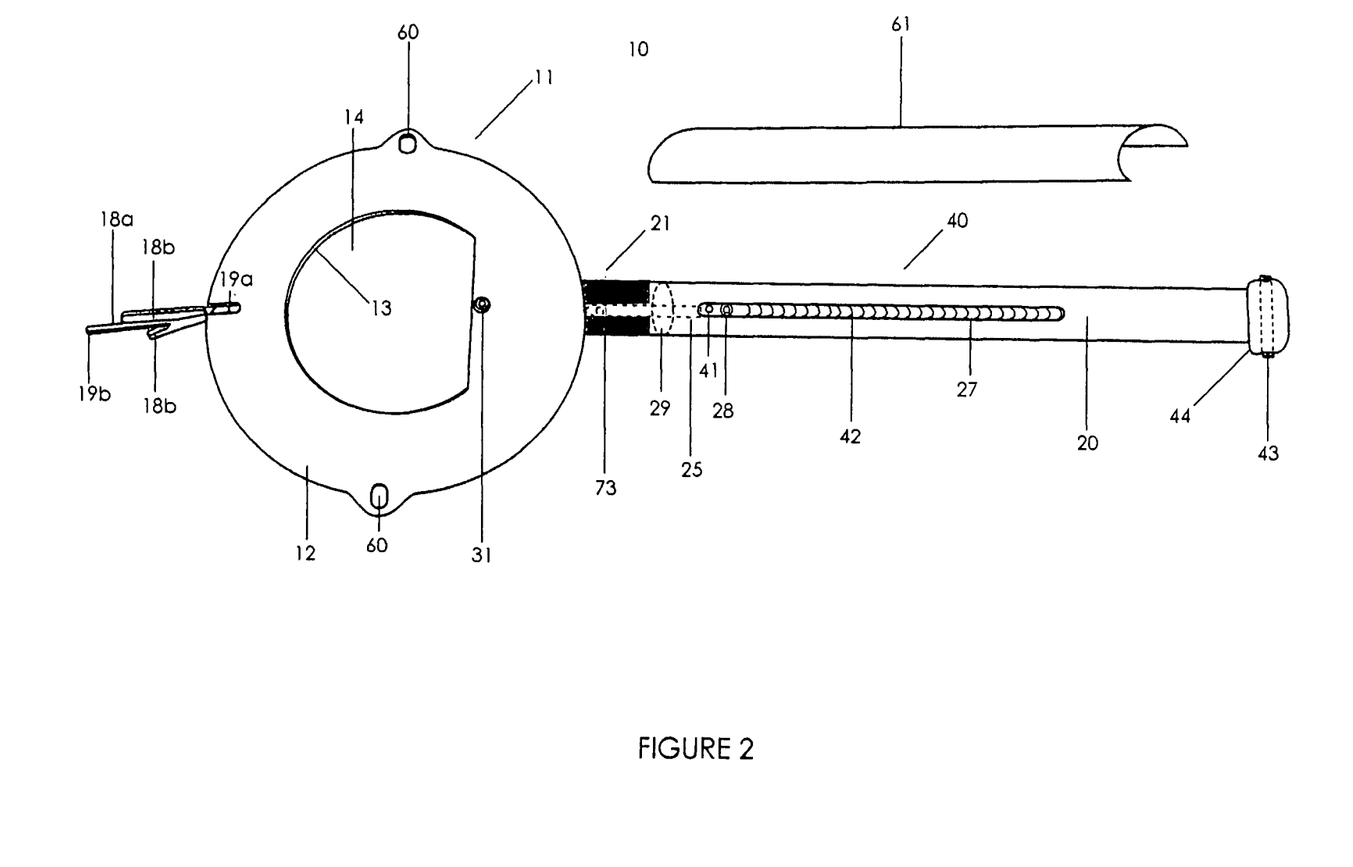
FIG. 2 illustrates a top plane of one embodiment of the present invention, having an elevation rod as a moving means and a detached housing cover.

The device of an embodiment of the present invention, depicted in FIGS. 1 and 2 (top plane view of one embodiment) depicts the extension mechanism 40 which causes the snare attachment port 41 to move longitudinally when the trigger mechanism 21 is engaged or triggered by applied pressure 10b to the trigger plate assembly 11. The foot snare triggering device 10 triggers the foot snare 10a and allows it to be released from the extension mechanism 40 at the snare attachment port 41 after being triggered.

The trigger plate assembly 11, of one embodiment shown in FIGS. 1 and 2, comprises a base plate 12 having a plate underside 16 and defining a pan opening 13. A pan 14 is pivotally connected by a pan hinge 15 to the plate underside 16 distal to the pan tension adjustment means 30 (shown in FIG. 3) and the trigger mechanism 21. The pan 14 has a trigger mount 70 located adjacent to the trigger assembly connection 29 through which the trigger mount 70 engagingly receives the trigger mechanism 21, said mount 70 having a mount slot 71 (shown in FIG. 3) to cooperatively receive and engage the trigger mechanism 21. In the embodiment of the present invention depicted in FIG. 3 (a partial, plane view of the trigger mechanism 21), the trigger mount 70 is angularly attached to the pan 14 toward the trigger mechanism 21 and may be otherwise described as a downward bending portion of the pan 14, in another embodiment. The pan 14 pivots downward when receiving the applied pressure 10b thereby engaging the trigger mechanism 21. The base plate 12 can be of varying diameters depending on the size of the target animal to be captured in a foot snare 10a. The pan 14 has a slightly larger diameter than the pan opening 13, and is connected by a pan hinge 15 to the plate underside 16 allowing the pan 14 to pivot downwardly when said pressure 10b, shown in FIG. 1, is applied to the pan 14.

Figure 3:
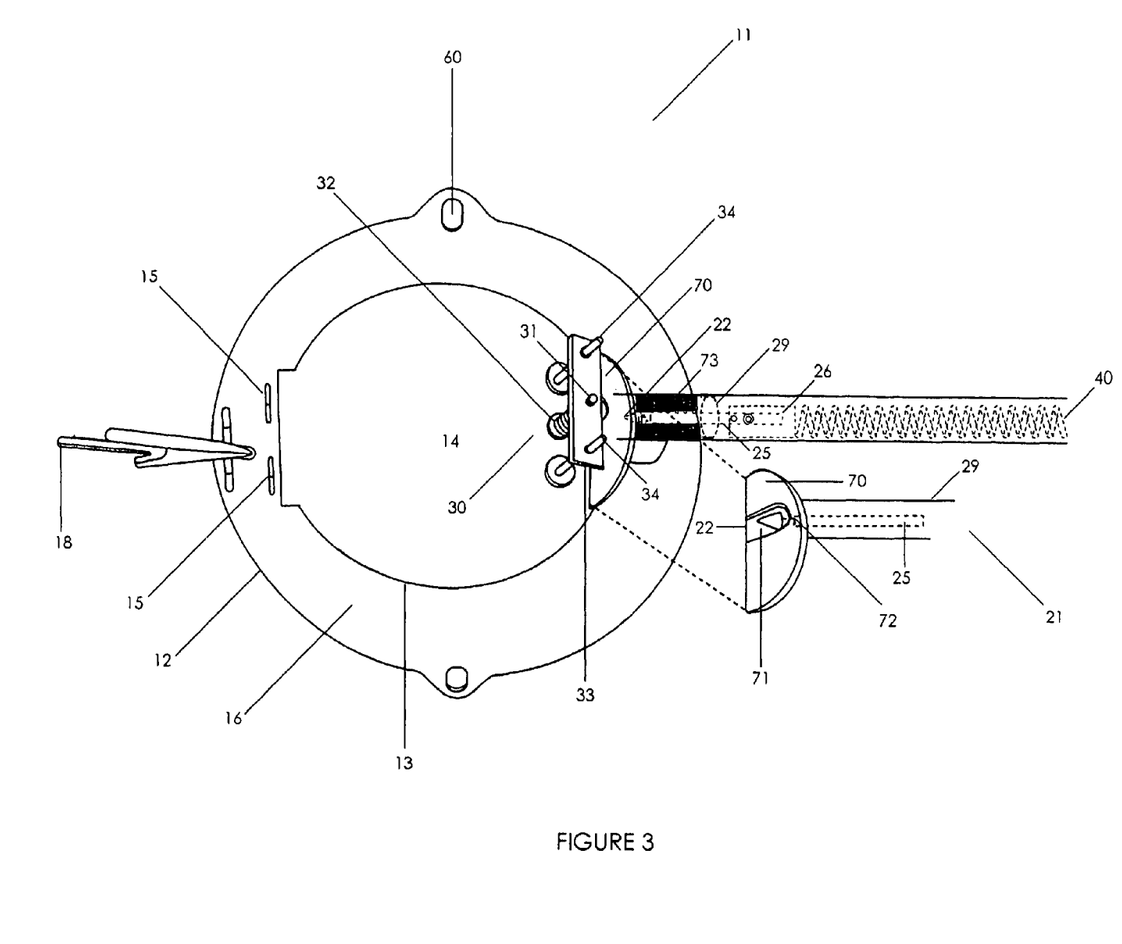
FIG. 3 illustrates a partial, plane bottom view of an embodiment of the present invention, depicting a plate underside of the base plate and the pan tension adjustment means, including an enlarged view of trigger mount engaging the trigger rod.

FIG. 3 illustrates a partial, plane bottom view of an embodiment of the present invention, depicting the plate underside 16 of the base plate 12 and the pan tension adjustment means 30, including an enlarged view of a triggering mount 70 for accepting and engaging a trigger rod 25 to the trigger mechanism 21. As further shown in FIG. 3, the pan tension adjustment means 30 comprises a pan tension adjustment bolt 31, passing through the base plate 12 and pan 14, a pan tension adjustment spring 32, to regulate trigger mechanism 21 response to applied pressure 10b to the pan 14, through which said bolt 31 passes, a pan tension adjustment plate 33, having threaded features to accept and connect to said bolt 31, and a plurality of pan tension adjustment stabilizers 34, affixed to the pan 14, to hold the pan tension adjustment plate 33 in place. The pan 14 is held upward and in place against the plate underside 16 by the pan tension adjustment means 30. The pan tension adjustment means 30 responds to the vertically applied pressure 10b when animal prey steps on the pan 14, and is utilized to gauge the pressure 10b anticipated for engaging or releasing said device 10.

One embodiment of the present invention also comprises a moving means 18, attached to the trigger plate assembly 11 as shown in FIGS. 1 and 2, within which the foot snare 10a removably rests, allowing the foot snare 10a to move obliquely toward the extension mechanism 40 when the trigger mechanism 21 is engaged. The moving means 18 depicted in FIG. 2, in an alternate embodiment of the present invention is an elevation rod 18a comprising a rod hinge end 19a pivotally attached to the base plate 12 adjacent to the pan hinge 15 and the pan tension adjustment means 30 (shown in FIG. 3) and an opposing free end 19b having a plurality of rod notches 18b in which the foot snare 10a may be placed. The elevation rod 18a is pivotally attached to the base plate 14 of the trigger plate assembly 11, and the foot snare 10a is placed in one of the plurality of rod notches 18b while the elevation rod 18a is laying flat, or horizontal, depending on the capture height of the target animal. In an alternative embodiment, the invention can have a plurality of elevation rods 18a.

As shown in FIGS. 3, 4 (a top, plane view of the trigger mechanism 21) and 6 (an elevated side view of the extension mechanism 40 and the trigger mechanism 21), the trigger mechanism 21 further comprises a trigger assembly stabilizer 26, the trigger rod 25 longitudinally attached to the trigger assembly stabilizer 26, opposite the mechanism end 23, and a trigger alignment means 28 located in said stabilizer 26 for alignment of the trigger mechanism 21. The trigger rod 25 in this embodiment of the present invention, as shown in FIGS. 3, 4 and 6 has a trigger catch 72 to releasably engage, or catch onto, the mount slot 71 of the trigger mount 70, thereby holding in tension the extension mechanism 40 until the pan 14 is depressed, or pivoted.

Figures 7, 8, 9:
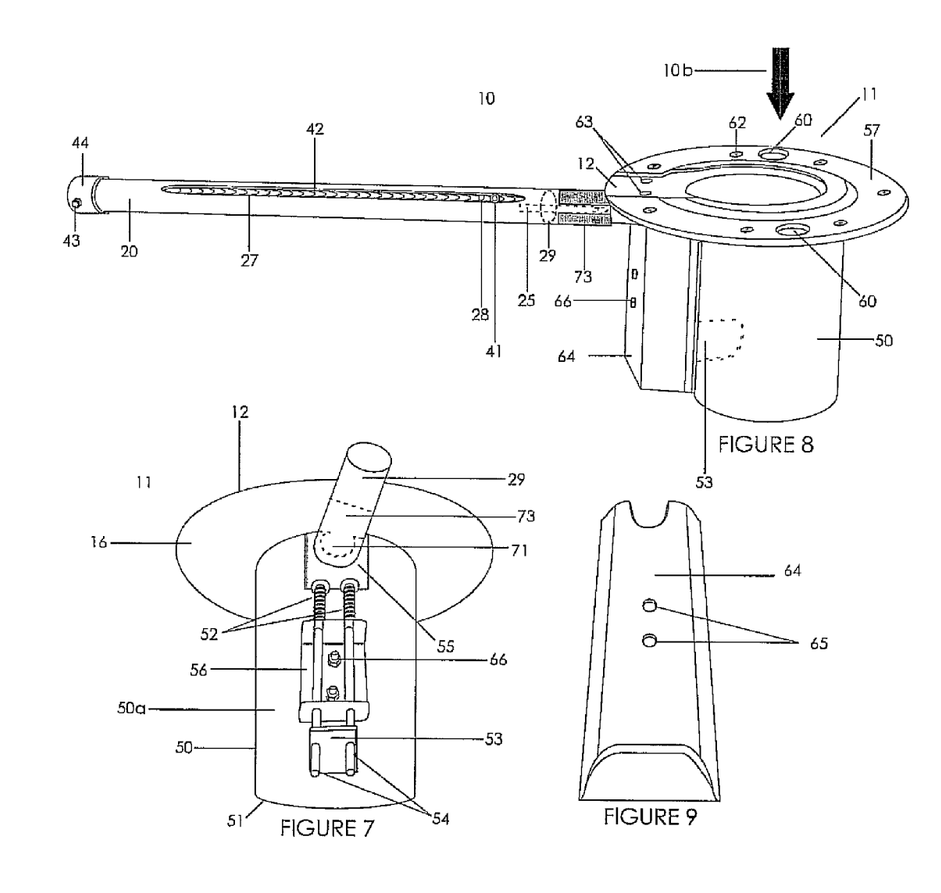
FIG. 7 illustrates a partial bottom rear perspective view of one embodiment of the present invention, the trigger plate assembly having a pipe set firing mechanism contained on a vertical pipe.
FIG. 8 illustrates a side elevational, perspective view of one embodiment of the present invention, the trigger plate assembly having a pipe set firing mechanism contained on a vertical pipe and a snare guard in place of a moving means.
FIG. 9 illustrates a perspective view of the cover plate to the firing assembly, with the cover plate attachment holes for the embodiment of the present invention illustrated in FIG. 3.

In an embodiment of the present invention shown in FIGS. 1, 2, and 7 (a partial bottom rear perspective), the trigger mechanism 21 further comprises a trigger assembly connection 29 attaching to the base plate 12, enclosed within a trigger housing 20, and engaging the trigger mechanism 21 to the base plate 12 as shown in FIG. 2. The trigger assembly connection 29 may take the form of a short pipe or other short conduit attached to the base plate 12. In an alternative embodiment, the trigger assembly connection 29 interiorly includes a trigger rod alignment tube 73 in cooperative contact and engagement with the trigger rod 25, to center align the trigger rod 25 with the trigger mount 70, as shown in FIG. 3. The trigger rod alignment tube 73 may be made of a high density moldable material, such as plastic, pressed into the interior of said connection 29.

As shown in FIGS. 1, 2 and 3, in the device of the present invention, the trigger mechanism 21 and the extension mechanism 40 are enclosed in the trigger housing 20 (also shown in FIG. 5, a top plane view), having an end cap 44 opposingly located at the opposite end of trigger housing 20 from the trigger mechanism 21 and cooperatively adjacent to the extension mechanism 40 and a housing slot 27 inserted longitudinally along the trigger housing 20, allowing the snare attachment port 41 and an attached snare attachment means 45 attached, fastened or secured to foot snare 10a to cooperatively move with the trigger mechanism 21 along the housing slot 27 within the trigger housing 20 toward the end cap 44 when the device 10 is triggered. In another embodiment, the trigger housing 20 may include a housing cover 61, as illustrated in FIG. 2. The trigger housing 20 is of hollow tubular construction, as is the enclosed trigger assembly connection 29.

Figure 6:
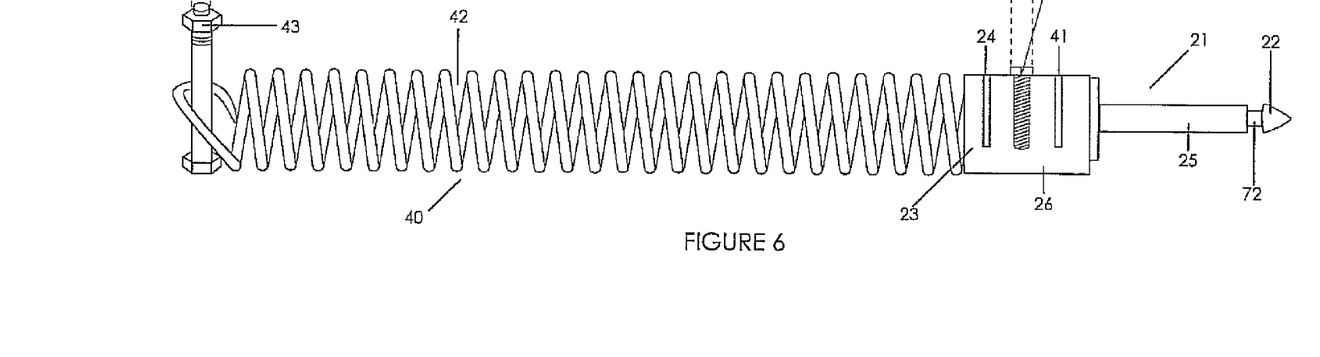
FIG. 6 illustrates an elevated side view of the extension mechanism and trigger mechanism housed in the trigger housing as depicted in FIG. 2, where the trigger rod is engaged in that embodiment of the present invention.

The expansion mechanism 40 in one embodiment of the present invention, depicted in FIGS. 4 and 6, comprises a return spring 42 longitudinally connected to the mechanism end 23 of the trigger mechanism 21 at a spring attachment hole 24 and to an opposite return spring attachment anchor 43 in the end cap 44. The return spring 42 tensionally engages the trigger mechanism 21 at the mechanism end 23 and anchors to said housing 20 by the return spring attachment anchor 43 within the end cap 44. FIG. 4 shows the plane top view of the trigger mechanism 21 and the attached extension mechanism 40 disengaged from the trigger plate assembly 11 (shown in FIG. 3). The return spring 42, as the extension mechanism 40 of one embodiment, is held in place at the back of the trigger housing 20 via the return spring attachment anchor 43, which may be inserted through a hole, or fastened in other alternative embodiments, in the end cap 44, and attached at its opposite mechanism end 23 to the trigger assembly stabilizer 26 via the spring attachment hole 24. The trigger rod 25 is attached to the trigger assembly stabilizer 26 and tightened and centered by the trigger alignment means 28, which stabilizer 26 not only holds the trigger rod 25 in place but also keeps the extension mechanism 40 in place, when the extension mechanism 40 is extended far enough to slide forward or backward through the housing 20. The trigger alignment means 28 to align the trigger mechanism 21 may be an alien bolt or other aligning, or similarly useful, tool.

Figure 5:
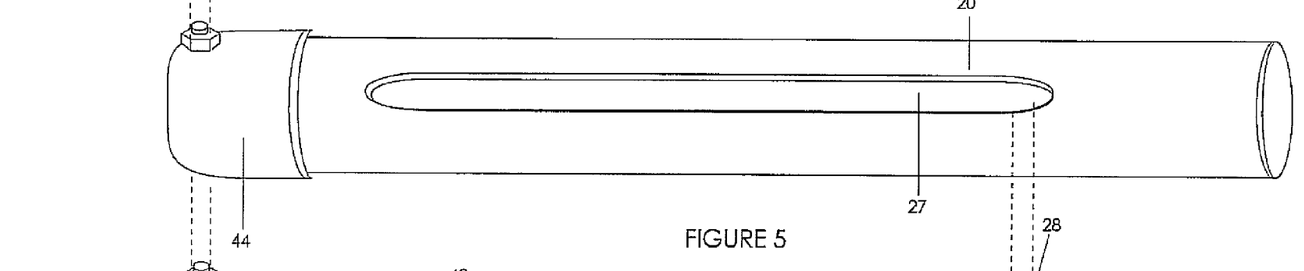
FIG. 5 illustrates a top plane view of the trigger housing, showing the housing slot of an embodiment of the present invention.

FIG. 5 shows a top plane view of the trigger housing 20, in one embodiment, containing the trigger mechanism 21 and extension mechanism 40 of the present invention. The snare attachment port 41 is a hole in the trigger assembly stabilizer 26, which may be initially utilized in an embodiment of the present invention for a setting tool inserted to slide the trigger mechanism 21 forward to engage the trigger rod 25 into the trigger mount 70. This snare attachment port 41 is principally utilized in the present invention to insert a releasable snare attachment means 45, which may be installed as part of a foot snare 10a, shown in FIG. 1.

As depicted in FIG. 1, in an embodiment of the present invention, the foot snare triggering device 10 has the snare attachment means 45 that may be slidably located and secured on a foot snare 10a. The snare attachment means 45 is releasably installable in the snare attachment port 41 and thereby connectable to the foot snare triggering device 10, adapting the present invention to be usable in combination with foot snares 10a commonly known in the industry. The snare attachment means 45 may be an eye bolt, or a clip, bolt, catch or other fastener, connectable and installable, and detachable or releasable, from the snare attachment port 41, to temporarily and slidably secure a foot snare 10a, when the foot snare 10a is set, then triggered, by the foot snare triggering device 10.

When the trigger mechanism 21 fires longitudinally backward with release of the extension mechanism 40 and tightens the foot snare 10a by operation of the foot snare triggering device 10, cinching the foot snare 10a, said snare 10a, by the snare attachment means 45, may be extracted and released from the snare attachment port 41 in the trigger assembly stabilizer 26, rendering the foot snare 10a independent from the foot snare triggering device 10. The end cap 44 anchors the extension mechanism 40, and the housing slot 27 enables access to the extension mechanism 40 to set said device 10.

FIG. 6 shows an elevated side view of the extension mechanism 40 and trigger mechanism 21 which are housed in the trigger housing 20 (shown in FIG. 5) where the trigger rod 25 is set or triggered, in that embodiment of the present invention.

Once the trigger housing 20 is connected to the trigger plate assembly 11, the trigger mechanism 21 is pushed or pulled in place, and the trigger rod 25 (having a pointed or cooperating trigger end 22 in one embodiment) engages into the mount slot 71 which is located on a downward bend in the pan 14. The pan tension adjustment spring 32, below the pan 14 as shown in FIG. 3, provides pressure to the trigger mount slot 71 for holding the trigger rod 25, and setting, arming or triggering said device 10.

In FIG. 1, an attachment bolt or other snare attachment means 45, as noted above, may be connected to the foot snare 10a as a means to attach the snare 10a to the trigger mechanism 21 at its snare attachment port 41 in the trigger assembly stabilizer 26, through the housing slot 27. The snare 10a is then placed on the base plate 12 around the pan 14, as shown in FIG. 1. The loose end of the snare 10a, generally, is connected to an anchoring device or staked out, in its common usage in the industry. When an animal of desired weight steps on the pan 14, the pan 14 drops or pivots slightly releasing the trigger rod 25 from the trigger mount 70, shown in FIG. 3. When the trigger mechanism 21 slides or is pulled back by the extension mechanism 40 it pulls or cinches the snare 10a simultaneously upward and sideways, by operation of the moving means 18, capturing the animal at the desired height on the leg. With upward movement, the cinched foot snare 10a may then disengage from the trigger mechanism 21 when the foot snare 10a (by the snare attachment means 45) slides or pulls out of the snare attachment port 41 in the trigger assembly stabilizer 26, as noted above, by any animal resistance.

Figure 10:
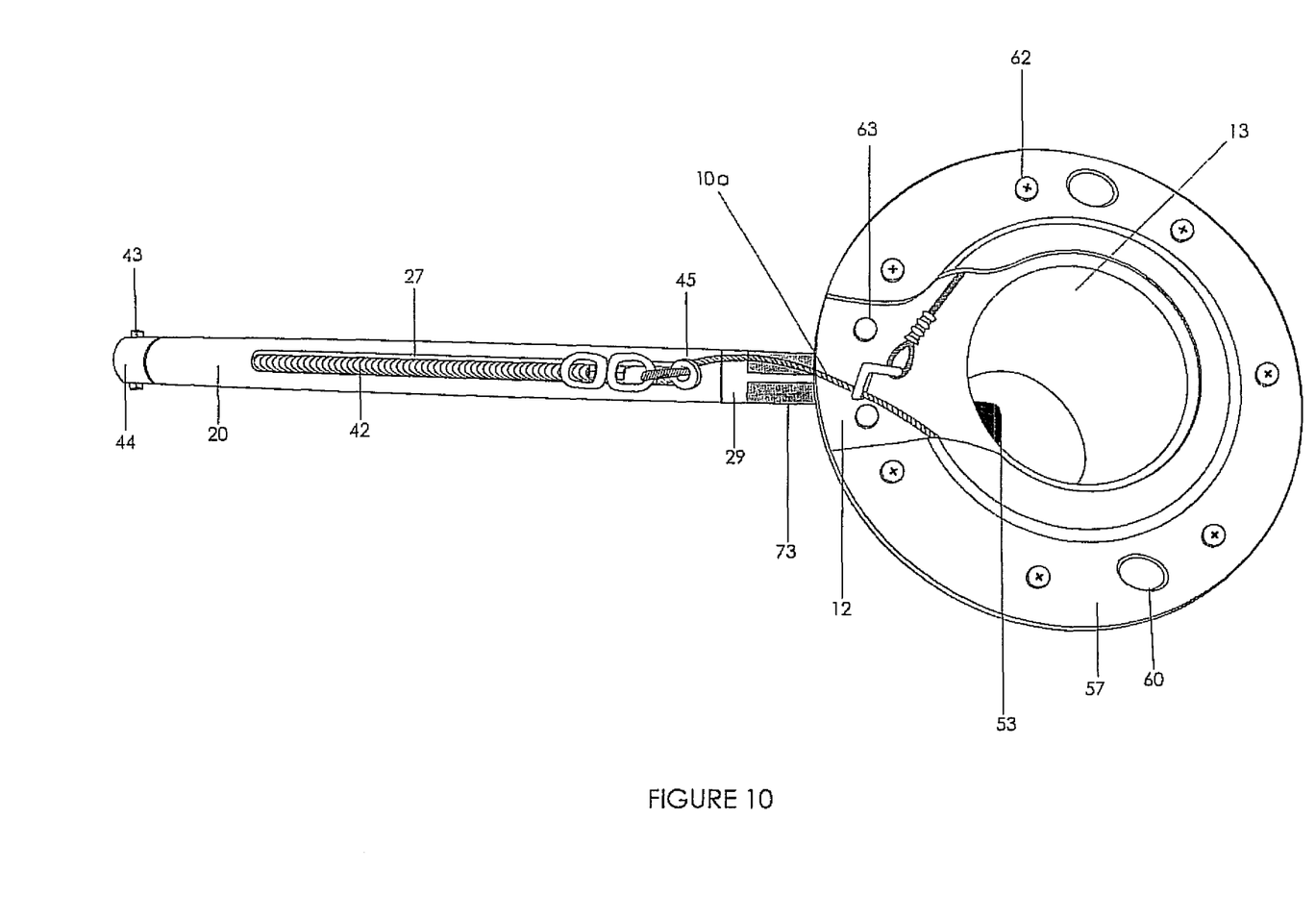
FIG. 10 illustrates a top plane view of the embodiment of the present invention shown in FIG. 8.

In an alternative embodiment of the present invention, having a pipe set firing mechanism 50a, depicted in FIGS. 7, 8 and 10, the trigger plate assembly 11 comprises the base plate 12 with a plate underside 16, defining a pan opening 13 and a vertical pipe 50 cooperatively attached to the plate underside 16 and having an opposite lower end 51. As shown in detail in the partial, bottom rear perspective view of FIG. 7, this embodiment also comprises the pan tension adjustment means 30, of FIG. 1, comprising the pipe set firing mechanism 50a having a plurality of firing mechanism springs 52 in cooperative connection with a firing pan 53, which when depressed triggers the snare device 10, and a trigger insert plate 55 engaging the pipe set firing mechanism 50a to the trigger mechanism 21, and a plurality of firing mechanism stabilizing rods 54. The pipe set firing mechanism 50a responds to the vertically applied pressure 10b when animal prey steps on the firing pan 53, and is utilized to gauge the pressure 10b anticipated for engaging or releasing said device 10. The firing pan 53 in this embodiment has a trigger insert plate 55 located adjacent to the trigger assembly connection 29, through which the trigger insert plate 55 engagingly receives the trigger mechanism 21, the trigger insert plate 55 having a mount slot 71 to cooperatively receive and engage the trigger mechanism 21. The pipe set firing mechanism 50a is secured on the vertical pipe 50 by a firing mechanism bracket means 56 and located proximal to the lower end 51, as shown in FIG. 8, a side elevational view of one embodiment of the present invention. FIG. 7 shows the plate underside 16 connected to the vertical pipe 50 in this alternative embodiment. The plurality of firing mechanism stabilizing rods 54 are run through the firing mechanism bracket means 56 and are in cooperative connection to the firing pan 53 which extends from the back to the inside of the vertical pipe 50 via a hole through said pipe 50, proximal to the lower end 51 of the vertical pipe 50. Said stabilizing rods 54 are operatively and cooperatively attached to the trigger insert plate 55. Between the trigger insert plate 55 and the said firing mechanism bracket means 56 are the plurality of firing mechanism tension springs 52, which help hold the trigger rod 25 in place when the trigger mechanism 25 is set.

The pipe set firing mechanism 50a in the embodiment shown in FIG. 7 may be housed in a cover plate 64, shown in FIG. 9 having cover plate attachment holes 65. The firing mechanism bracket means 56 and the cover plate 64 in this embodiment are secured to the vertical pipe 50 by cover plate attachment bolts 66, as depicted in FIGS. 7, 8 and 9. As well, in this alternative embodiment of the present invention, the trigger plate assembly 11 further comprises a snare guard 57, covering the base plate 12, as shown in FIG. 8. The snare guard 57 provides a groove or guard in which the foot snare 10a is placed, making it inaccessible by animals. In this embodiment, depicted by FIGS. 8 and 10, the trigger mechanism 21 is engaged by applied pressure 10b to the trigger plate assembly 11, triggering the foot snare 10a, which is being held temporarily in place until triggered, by the snare guard 57.

In operation, the vertical pipe 50, as shown in FIGS. 8 and 10 for this alternative embodiment, is inserted into a hole dug of sufficient depth to place the base plate 12 flush with the ground. A shallow trench is made to accommodate the trigger assembly housing 20. The base plate 12 is anchored in place by spikes via the stake holes 60. A setting tool or other instrument, noted above, is then placed into the snare attachment port 41, as noted above. Forward pressure applied slides the trigger rod 25 into the trigger insert plate 55 of the pipe set firing mechanism 50a. The trigger rod 25 is held in place by tension provided by the plurality of firing mechanism springs 52.

The device 10, depicted in FIGS. 1 and 10 of these two alternative embodiments, is now set. A foot snare 10a is then placed on the base plate 12 and as shown in the embodiment depicted in FIG. 10, tucked into the snare guard 57 covering the base cover plate 12. The foot snare 10a is then attached to the engaged extension mechanism 40 via the snare attachment means 45 adaptively or commonly provided with a foot snare 10a, which snare attachment means 45 is then inserted into the snare attachment port 41. The foot snare 10a, variations of which are generally known and found in the industry, is commonly equipped with a strong swivel or other anchoring device. A half pipe cover 61, depicted in FIG. 6, may be placed over the housing assembly slot 27 to prevent debris from entering the trigger housing 20. The snare guard 57 may be attached to the base plate 12 by any attaching means, such as rivets 62 or carriage bolts 63, or welded.

Bait is placed into the vertical pipe 50, in the embodiment depicted in FIGS. 8 and 10. When an animal reaches or steps into the vertical pipe 50 for that bait, the firing pan 53 is depressed. This disengages the trigger rod 25 from the trigger insert plate 55, thus enabling the trigger mechanism 21 to slide backward through the trigger housing 20. The foot snare 10a, connected by the snare attachment means 45, which had been placed into the snare attachment port 41, is then cinched and tightened around the animal's leg to hold the foot snare 10a in place. With any upward pressure or movement by the animal, the foot snare 10a at its snare attachment means 45 disengages from said device 10 when the snare attachment means 45 is extracted from the snare attachment port 41.

One embodiment of the present invention depicted in FIG. 1 is designed for most animals of varying sizes, such as bears, coyotes, mountain lions, wolves, feral hogs, foxes, deer, etc. The alternative embodiment of the present invention depicted in FIG. 10 is generally designed for larger animals such as black bears, grizzly bears, etc. and in alternative embodiments may be is equipped with a longer and more powerful spring enabling the user to set a larger snare diameter. Either embodiment may be adapted in alternative embodiments for different game animals.

The embodiment of the device 10 shown in FIG. 10 uses the same extension mechanism 40 as shown in FIG. 1, but differs in that the firing pan 53, which engages with the trigger rod 25, is recessed into the vertical pipe 50. The vertical pipe 50 may be inserted into a hole dug flush with the ground. Bait is inserted into the vertical pipe 50 and when the animal reaches into said pipe, the animal is then captured at the desired height on its leg when the foot snare 10a is triggered.

Having thus described in detail a preferred selection of embodiments of the present invention, it is to be appreciated, and will be apparent to those skilled in the art, that many physical changes could be made in the device without altering the invention, or the concepts and principles embodied therein. Unless otherwise specifically stated, the terms and expressions have been used herein as terms of description and not terms of limitation, and are not intended to exclude any equivalents of features shown and described or portions thereof. Various changes can, of course, be made to the preferred embodiment without departing from the spirit and scope of the present invention. The present invention and device, therefore, should not be restricted, except in the following claims and their equivalents.

I claim:

1. A foot snare triggering device, said device comprising:
    (a) a trigger plate assembly having a pan tension adjustment means for allowing the trigger plate assembly to pivotally yield to vertically applied pressure, the pan tension adjustment means further comprising:
        a pan tension adjustment bolt, passing through a base plate and pan,
        a pan tension adjustment spring through which said bolt passes,
        a pan tension adjustment plate connecting to the said bolt, and
        a plurality of pan tension adjustment stabilizers affixed to the pan;
    (b) a trigger mechanism having a trigger end and an opposite mechanism end, the trigger end engagingly set within the trigger plate assembly and the mechanism end operatively and tensionally attached to an extension mechanism, the trigger mechanism further comprising:
        a trigger assembly stabilizer, a trigger rod longitudinally attached to the trigger assembly stabilizer opposite the mechanism end,
        a trigger assembly connection attaching to the base plate and engaging the trigger mechanism to said plate,
        a trigger alignment means located in the trigger assembly stabilizer for aligning the trigger mechanism, and
        a trigger rod having a trigger catch to engage a mount slot within the trigger plate assembly;
    (c) a snare attachment port located within the trigger mechanism proximal to the trigger end for releasably securing a foot snare;
    (d) the extension mechanism causing the snare attachment port to move longitudinally when the trigger mechanism is triggered by applied pressure to the trigger plate assembly; and
    (e) whereby said triggering device triggers the foot snare and allows the foot snare to be released from the snare attachment port after being triggered.

2. The device of claim 1, wherein the trigger plate assembly further comprises:
    (a) the base plate having a plate underside and defining a pan opening;
    (b) the pan pivotally connected by a pan hinge to the plate underside distal to the pan tension adjustment means and the trigger mechanism;
    (c) the pan having a trigger mount located adjacent to the trigger assembly connection, through which the trigger mount engagingly receives the trigger mechanism, said mount having the mount slot to cooperatively receive and engage the trigger mechanism; and
    (d) the pan pivoting downward when receiving said applied pressure engaging the trigger mechanism.

3. The device according to claim 2, wherein the trigger mount of the pan is angularly attached to the pan towards the trigger mechanism.

4. The device of claim 1 further comprising a moving means attached to the trigger plate assembly, within which the foot snare removably rests, for allowing the foot snare to move obliquely toward the extension mechanism when the trigger mechanism is engaged.

5. The device according to claim 4, in which the moving means is an elevation rod comprising:
    (a) a rod hinge end pivotally attached to the base plate opposite the pan tension adjustment means; and
    (b) an opposing free end having a plurality of rod notches in which the foot snare is placed.

6. The device according to claim 5, in which the moving means is a plurality of elevation rods.

7. The device of claim 1, wherein the trigger mechanism and the extension mechanism are enclosed in a trigger housing, having an end cap opposingly located from the trigger mechanism and cooperatively adjacent to the extension mechanism, and a housing slot inserted longitudinally along the trigger housing allowing the snare attachment port and an attached snare attachment means to cooperatively move with the trigger mechanism along the housing slot toward the end cap when said device is triggered.

8. The device of claim 1, the extension mechanism comprising:
   (a) a return spring longitudinally connected to the mechanism end of the trigger mechanism at a spring attachment hole and an opposite return spring attachment anchor; and
   (b) the return spring tensionally engaging the trigger mechanism at the mechanism end and anchoring to said housing by the return spring attachment anchor within the end cap.

9. The device according to claim 1, wherein the trigger assembly connection interiorly includes a trigger rod alignment tube cooperatively engaging and centering the trigger rod.

10. The device of claim 1 further comprising:
   (a) the snare attachment means releasably installable in the snare attachment port for attaching the foot snare through the housing slot;
   (b) the snare attachment means slidably located on the foot snare; and
   (c) whereby the foot snare is further adapted to be used in combination with the foot snare triggering device.

\* \* \* \* \*